(12) United States Patent
Hsueh

(10) Patent No.: US 6,461,004 B1
(45) Date of Patent: Oct. 8, 2002

(54) REFLECTIVE DEVICE FOR ATTACHING ONTO VARIOUS OBJECTS

(76) Inventor: Yeong Shyan Hsueh, P.O. Box 10-69, Chong Ho, Taipei (TW), 235

( * ) Notice: Subject to any disclaimer, the term of this patent is extended or adjusted under 35 U.S.C. 154(b) by 0 days.

(21) Appl. No.: 09/876,868

(22) Filed: Jun. 8, 2001

(51) Int. Cl.[7] .............................................. G02B 7/182
(52) U.S. Cl. ...................... 359/879; 359/880; 359/838; 359/850
(58) Field of Search ................................ 359/879, 880, 359/838, 839, 850, 544, 871, 872

(56) References Cited

U.S. PATENT DOCUMENTS

| | | | | |
|---|---|---|---|---|
| 3,876,367 A | * | 4/1975 | Vorobeichikov et al. | .... 432/116 |
| 4,357,074 A | * | 11/1982 | Nardinni | ...................... 350/259 |
| 5,002,424 A | * | 3/1991 | Hedgewick | ................... 404/14 |
| 6,304,378 B1 | * | 10/2001 | Clausen | ....................... 359/456 |

* cited by examiner

Primary Examiner—Mohammad Sikder

(57) ABSTRACT

A reflective device includes a panel having one or more peripheral or concentric ribs, the ribs each includes an inclined surface inclined relative to the panel for reflecting purposes and for allowing the objects or the scene or the view around the reflective device to be reflected and seen with the ribs. The concentric ribs each includes a perpendicular surface perpendicular to the panel and a cusp formed between the perpendicular surface and the inclined surface. The panel includes a number of areas each having a number of the concentric ribs for reflecting purposes.

8 Claims, 8 Drawing Sheets

REFLECTIVE DEVICE FOR ATTACHING ONTO VARIOUS OBJECTS

BACKGROUND OF THE INVENTION

1. Field of the Invention

The present invention relates to a reflective device, and more particularly to a reflective device for attaching onto the bags, the envelopes, the purses, the notebooks, the pencil cases, or the other objects and for reflecting purposes.

2. Description of the Prior Art

Typical reflective devices may be attached onto the bags, the envelopes, the purses, the notebooks, the pencil cases, or the other objects, and for reflecting the scene or the view or the objects located around the reflective device. However, the reflective devices comprise a planer structure which may not generate the other reflective effects.

The present invention has arisen to mitigate and/or obviate the afore-described disadvantages of the conventional reflective devices for objects.

SUMMARY OF THE INVENTION

The primary objective of the present invention is to provide a reflective device for attaching onto the bags, the envelopes, the purses, the notebooks, the pencil cases, or the other objects, and for reflecting the scene or the view or the objects located around the reflective device.

In accordance with one aspect of the invention, there is provided a reflective device comprising a panel including one or more peripheral or concentric ribs extended therefrom, the concentric ribs each including an inclined surface inclined relative to the panel for reflecting purposes and for allowing the objects or the scene or the view around the reflective device to be reflected and seen with the ribs. The reflective device may be attached onto various kinds of objects, such as the bags, the envelopes, the purses, the notebooks, the pencil cases, or the other objects, and for reflecting the scene or the view or the objects located around the reflective device.

The concentric ribs each includes a perpendicular surface perpendicular to the panel. The panel preferably includes a center stud disposed in the concentric ribs.

The panel includes a plurality of areas provided therein, the areas of the panel each includes a plurality of the concentric ribs extended therefrom, the concentric ribs each includes an inclined surface inclined relative to the panel for reflecting purposes, and for allowing the objects or the scene or the view around the reflective device to be reflected and seen in each of the areas of the panel.

The panel includes a plurality of horizontal and vertical lines applied thereon for defining the areas therein.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 7:
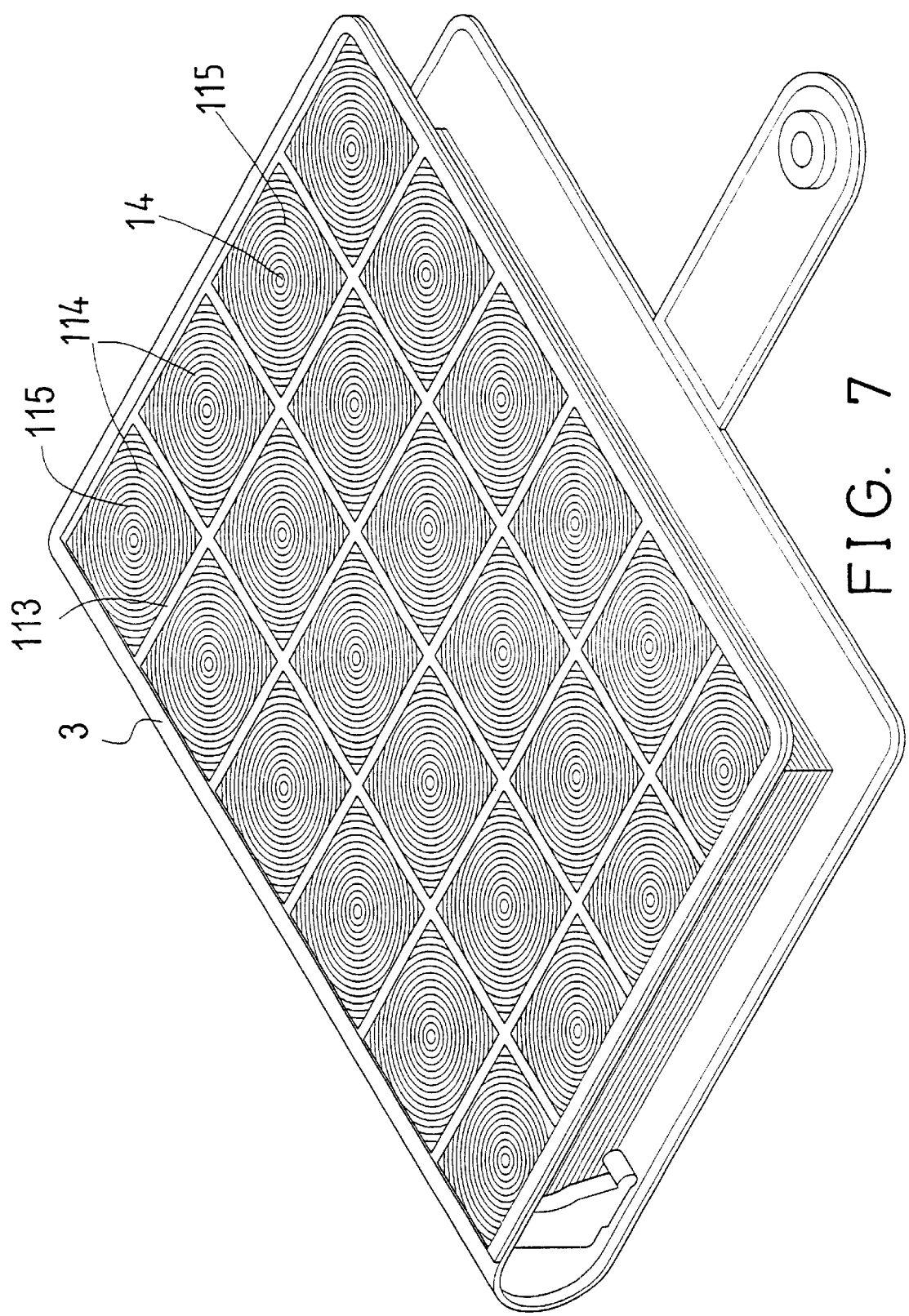
FIGS. 7, 8, 9 are perspective views illustrating the other applications or operations of the reflective device.
Figure 8:
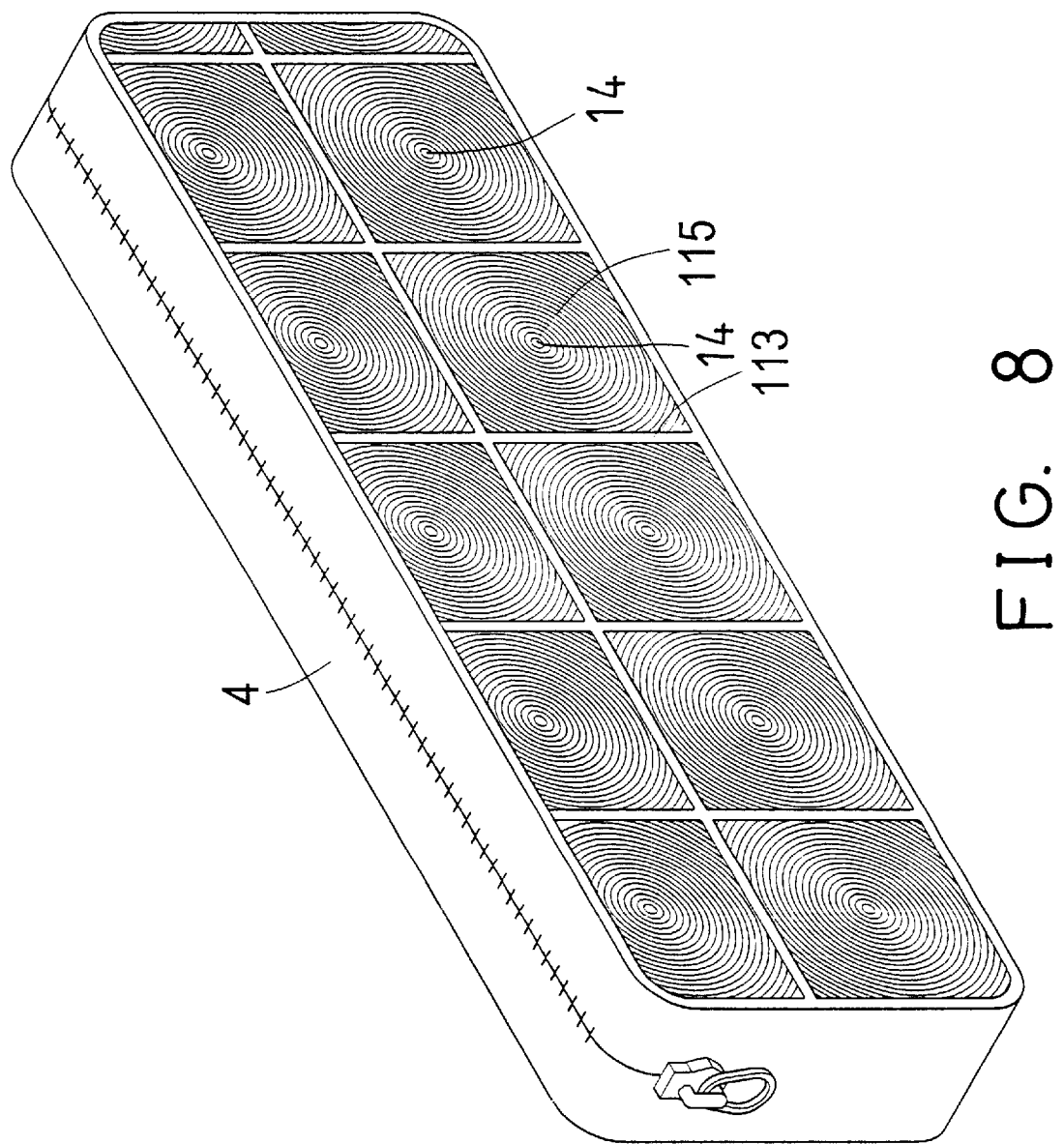
Figure 9:
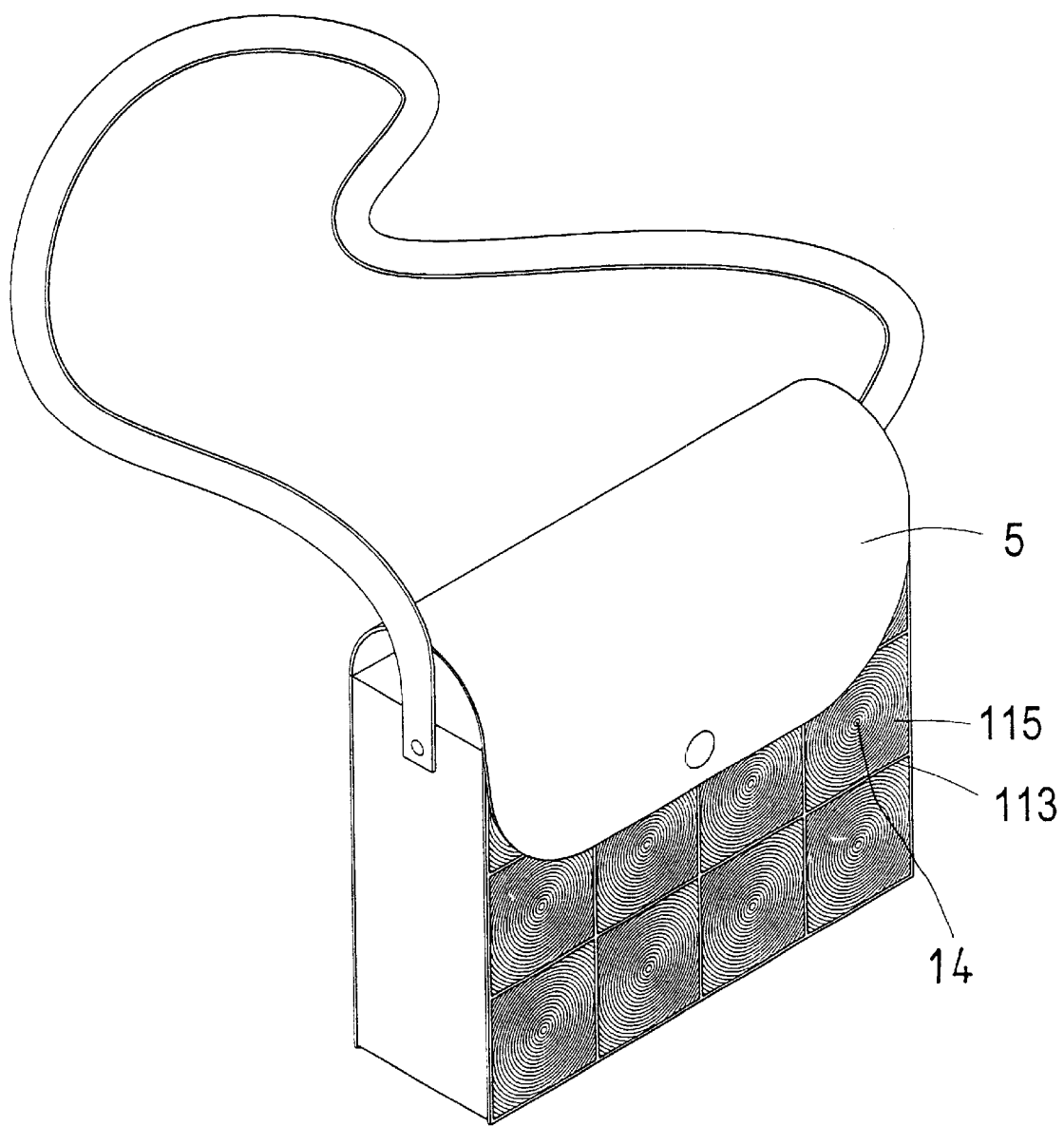

Referring to the drawings, and initially to FIGS. 1–4, a reflective device 1 in accordance with the present invention may be attached onto or formed as a cover portion or a wall portion or the other portions of the objects, such as the envelopes or the bags (FIGS. 1, 3, 5, 6, 9), the purses 5 (FIG. 9), the pencil cases 4 (FIG. 8), the notebooks 3 (FIG. 7), or the other objects, and for reflecting the scene or the view or the objects located around the reflective device.

Figure 4:
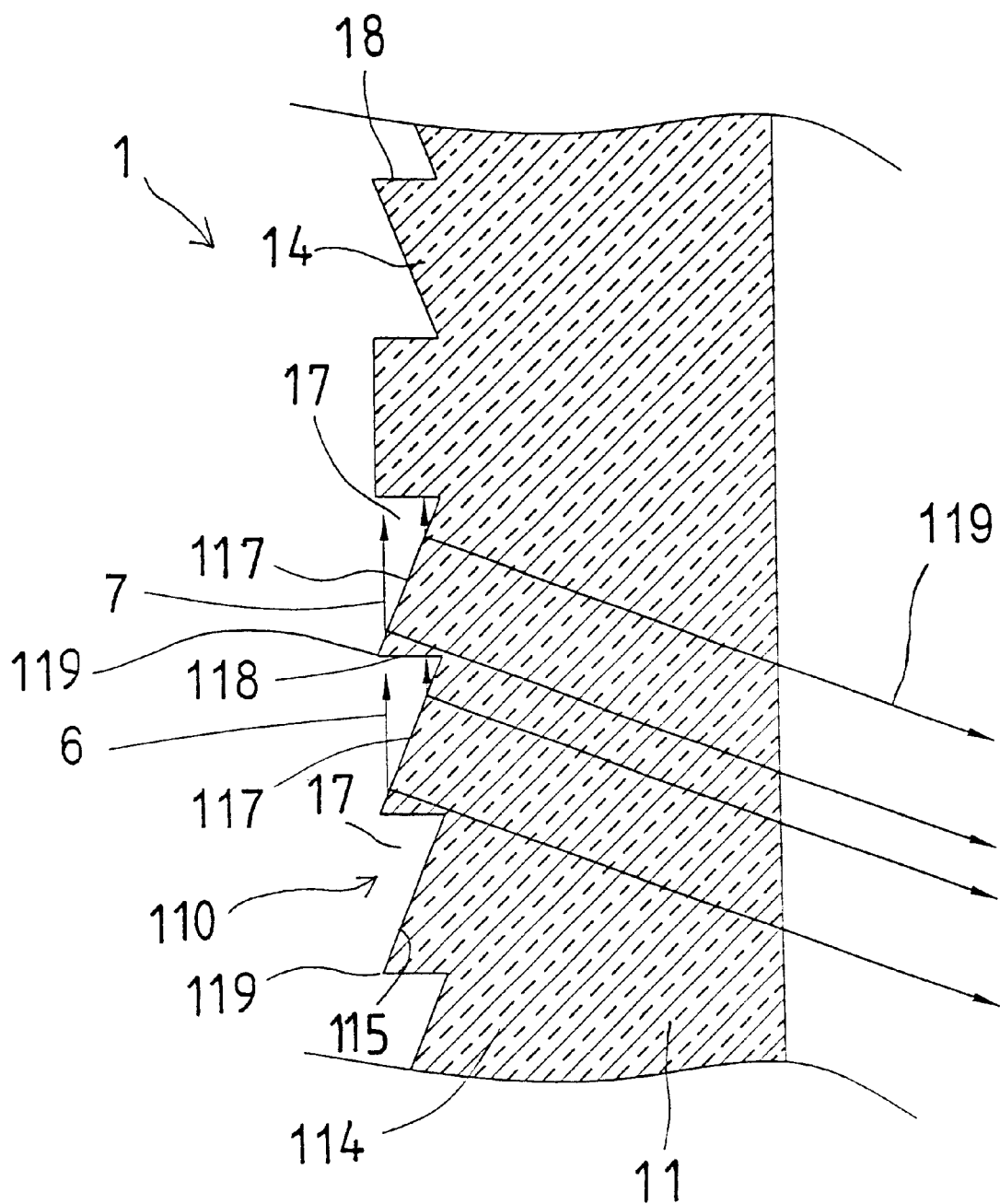
FIG. 4 is a partial cross sectional view taken along lines 4—4 of FIG. 2.
Figure 5:
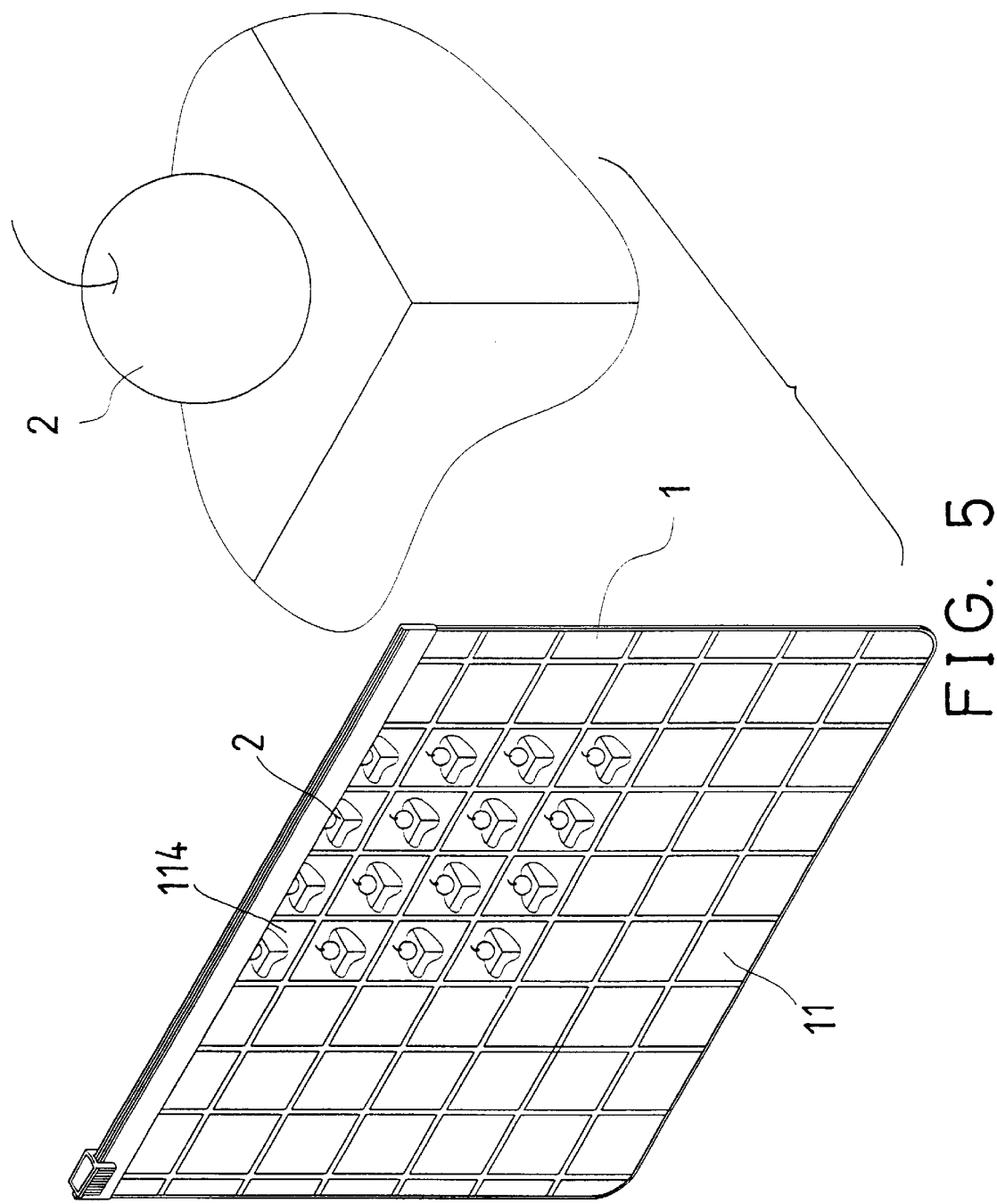
FIGS. 5 and 6 are exploded views similar to FIG. 1, illustrating the operation of the reflective device.
Figure 6:
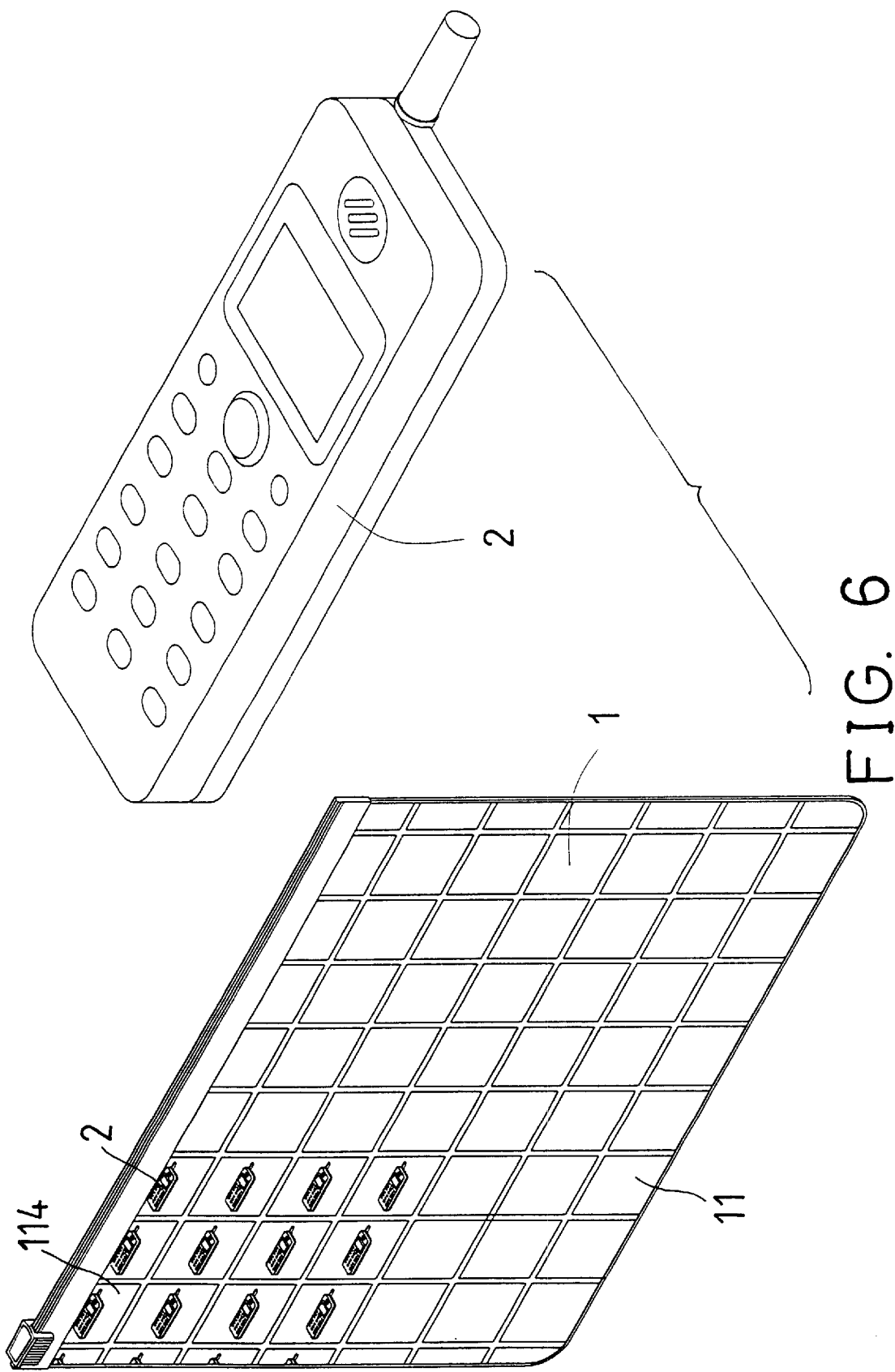

The reflective device 1 comprises a base plate or panel 11 including a front wall or an outer wall 110 having a number of horizontal and vertical lines 113 applied thereon or formed thereon for forming or defining a number of areas 114 therein, particularly the square areas 114 therein. In each of the areas 114 of the panel 11, the reflective device 1 includes a center or a center stud 14 and one or more concentric circular or peripheral ribs 115 extended therefrom and formed around the center 14. As best shown in FIG. 4, the center 14 and/or the concentric ribs 115 each includes a radially outward surface 118 perpendicular to the panel 11. The concentric ribs 115 each includes an oblique or inclined surface 117 inclined relative to the panel 11 or inclined from the radially outer portion toward the radially inward portion and inclined between the two radially outward surfaces 118 of two adjacent ribs 115, for forming or defining a cusp 119 between the surfaces 117, 118 and for forming or defining a number of concentric recesses 17 between the concentric ribs 115 and/or the center 14.

As shown in FIG. 4, the inclined surfaces 117 of the ribs 115 are inclined or tapered toward or facing toward the center 14. Alternatively, the inclined surfaces 117 of the ribs 115 may also be inclined or tapered or facing away from the center 14. The panel 11 is made of transparent or semi-transparent materials for reflecting purposes.

In operation, as shown in FIGS. 1, 5, 6 and 4, when the reflective device 1 is carried or moved across a scene or a view or an object 2 (FIGS. 1, 5, 6), the object 2 may be reflected by the reflective lines 119, 6, 7, and may thus be reflected and seen in each of the areas 114 of the panel 11; i.e., each of the areas 114 may have an object 2 reflected and seen therein. The objects 2 located in front of or behind the reflective device 1 may be reflected and seen in each of the areas 114 of the panel 11 due to the transparent or semi-transparent materials or characteristics of the panel 11.

Figure 1:
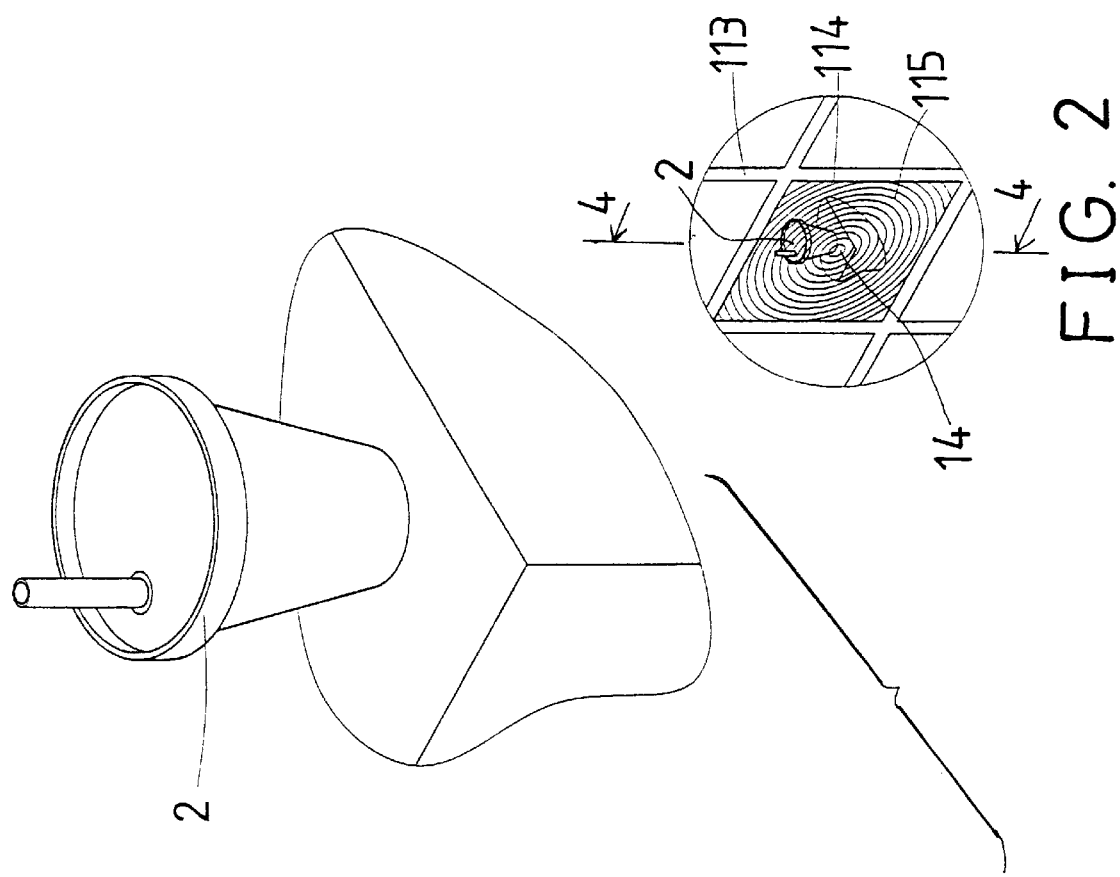
FIG. 1 is an exploded view of a bag having a reflective device in accordance with the present invention for reflecting the the scene or the view or the objects located around or close to the reflective device.
Figure 2:
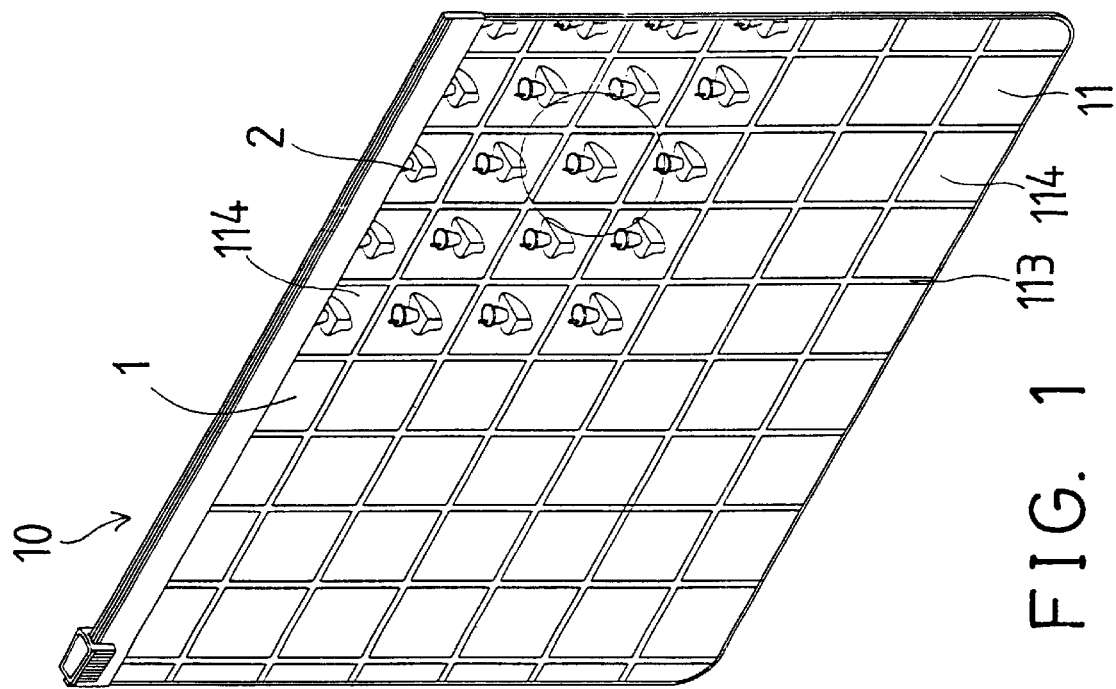
FIG. 2 is an enlarged partial perspective view of the reflective device.
Figure 3:
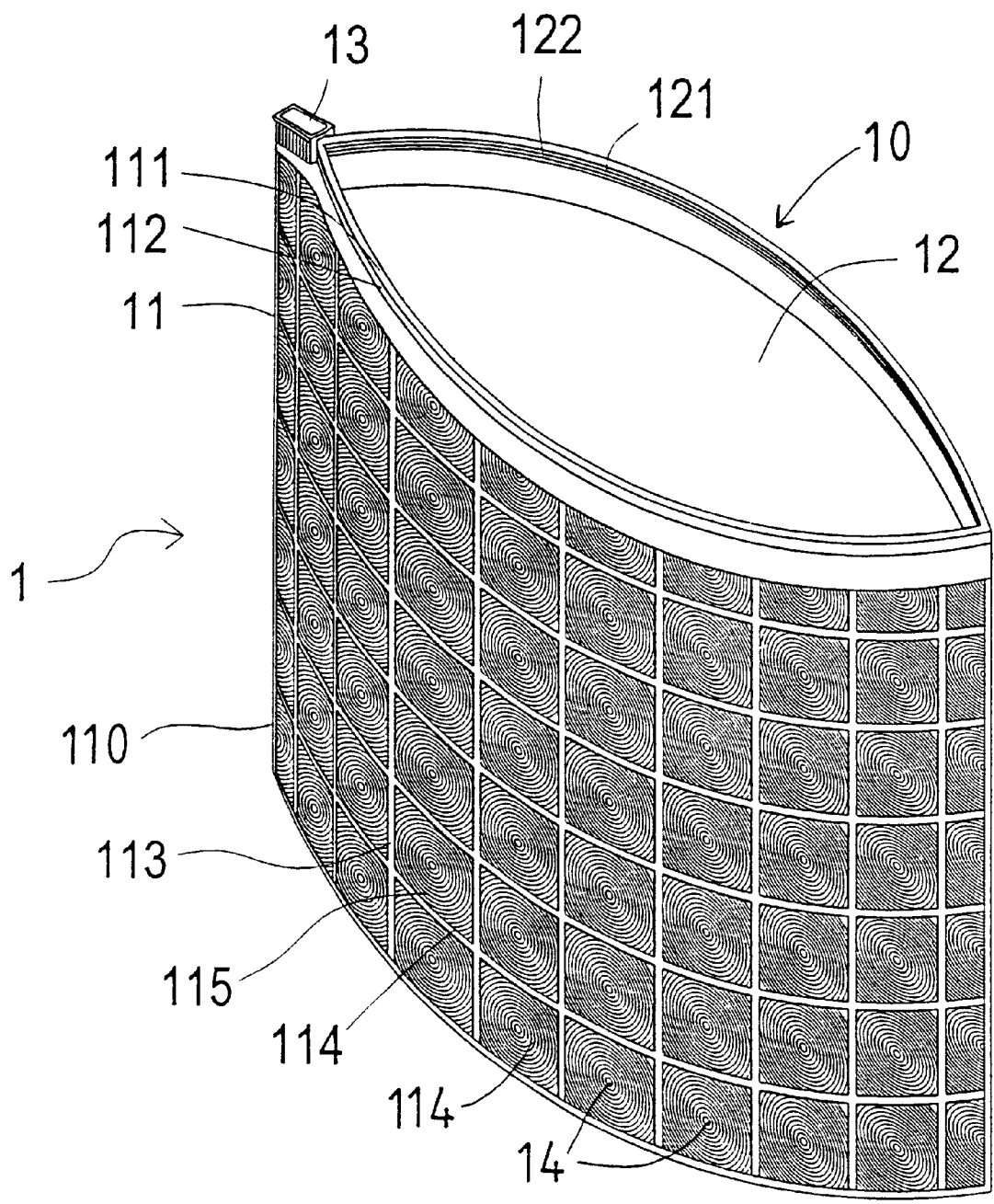
FIG. 3 is a perspective view of an opened bag having the reflective device attached thereon.

For example, as shown in FIGS. 1 and 3, the reflective device may be attached onto the object 10, such as the envelope or the bag (10); or the panel 11 of the reflective device 1 may be formed and provided as the front wall or the outer wall 110 of the bag 10 which includes a plate 12 having two or more edges secured to the panel 11 with welding processes or the like. The panel 11 and the plate 12 may each include an engaging member 111, 121 having one or more flanges or tracks or grooves 112, 122 formed or provided on one edge thereof for engaging with each other and for locking or engaging with each other and for enclosing the bag 10. A typical lock device 13 may be used for forcing the engaging members 111, 121 together and for enclosing the bag 10 when the typical lock device 13 is moved across the engaging members 111, 121. A typical zipper device may also be used for enclosing the bag 10. The plate 12 is also preferably made of transparent or semi-transparent materials for reflecting purposes.

Accordingly, the reflective device in accordance with the present invention may be used for attaching onto the bags, the envelopes, the purses, the notebooks, the pencil cases, or the other objects, and for reflecting the scene or the view or the objects located around the reflective device.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A reflective device comprising:

a panel including at least one peripheral rib extended therefrom, said at least one peripheral rib including an inclined surface inclined relative to said panel for reflecting purposes, and said panel including a center stud disposed in said at least one peripheral rib.

2. A reflective device comprising:

a panel including an outer surface, and including at least one peripheral rib extended from said outer surface of said panel, said at least one peripheral rib including an inclined surface inclined relative to said panel for reflecting purposes, and said panel including a center stud disposed in said at least one peripheral rib.

3. The reflective device according to claim 2, wherein said at least one peripheral rib includes a perpendicular surface perpendicular to said panel, and includes a cusp formed between said perpendicular surface and said inclined surface thereof.

4. A reflective device comprising:

a panel including a plurality of concentric ribs extended therefrom, said concentric ribs each including an inclined surface inclined relative to said panel for reflecting purposes.

5. The reflective device according to claim 4, wherein said concentric ribs each includes a perpendicular surface perpendicular to said panel.

6. The reflective device according to claim 4, wherein said panel includes a center stud disposed in said concentric ribs.

7. The reflective device according to claim 4, wherein said panel includes a plurality of areas provided therein, said areas of said panel each includes a plurality of said concentric ribs extended therefrom, said concentric ribs each includes an inclined surface inclined relative to said panel for reflecting purposes.

8. The reflective device according to claim 7, wherein said panel includes a plurality of horizontal and vertical lines applied thereon for defining said areas therein.

* * * * *